United States Patent
Frost et al.

(10) Patent No.: US 9,698,937 B2
(45) Date of Patent: Jul. 4, 2017

(54) HIGH SPEED UPLINK CONTROL CHANNELS

(71) Applicant: Vodafone IP Licensing Limited, Newbury, Berkshire (GB)

(72) Inventors: Timothy James Frost, London (GB); Yannick Le Pezennec, London (GB); Prakash Bhat, London (GB)

(73) Assignee: Vodafone IP Licensing Limited, Newbury, Berkshire (GB)

(*) Notice: Subject to any disclaimer, the term of this patent is extended or adjusted under 35 U.S.C. 154(b) by 112 days.

(21) Appl. No.: 14/253,672

(22) Filed: Apr. 15, 2014

(65) Prior Publication Data
US 2014/0307656 A1    Oct. 16, 2014

(30) Foreign Application Priority Data
Apr. 15, 2013 (GB) .................... 1306830.9

(51) Int. Cl.
| H04L 29/08 | (2006.01) |
| H04L 1/00 | (2006.01) |
| H04L 1/16 | (2006.01) |
| H04L 1/18 | (2006.01) |

(52) U.S. Cl.
CPC .......... *H04L 1/0029* (2013.01); *H04L 1/1671* (2013.01); *H04L 1/1819* (2013.01)

(58) Field of Classification Search
CPC ............................ H04L 1/0022; H04L 1/0029
See application file for complete search history.

(56) References Cited

U.S. PATENT DOCUMENTS

| 7,106,694 B1* | 9/2006 | Salonen ................ H04L 1/0025 370/230 |
| 2004/0085936 A1* | 5/2004 | Gopalakrishnan .......................... H04W 72/0413 370/335 |
| 2005/0047393 A1* | 3/2005 | Liu ..................... H04L 12/6418 370/352 |
| 2006/0240826 A1* | 10/2006 | Shinozaki ............ H04L 1/0009 455/436 |
| 2007/0218883 A1* | 9/2007 | Sebire ..................... H04L 29/06 455/414.4 |
| 2009/0185638 A1* | 7/2009 | Imamura ........... H04W 72/0406 375/298 |
| 2010/0023830 A1* | 1/2010 | Wengerter ........... H04L 1/0025 714/748 |
| 2010/0113004 A1* | 5/2010 | Cave .................. H04W 52/365 455/422.1 |

(Continued)

FOREIGN PATENT DOCUMENTS

| EP | 1343302 EP | 9/2003 |
| WO | WO2004/068886 | 8/2004 |

(Continued)

OTHER PUBLICATIONS

GB Search Report for GB 1306830.9 dated Oct. 15, 2013.

(Continued)

*Primary Examiner* — Jay P Patel
(74) *Attorney, Agent, or Firm* — Workman Nydegger

(57) ABSTRACT

Methods and network entities for communicating control signalling for an uplink high speed data service, a downlink high speed data service or both over a radio interface of a cellular network.

13 Claims, 7 Drawing Sheets

(56) References Cited

U.S. PATENT DOCUMENTS

| | | | |
|---|---|---|---|
| 2011/0103335 A1* | 5/2011 | Golitschek Edler von Elbwart | |
| | | | ............................ H04L 1/0026 |
| | | | 370/329 |
| 2011/0110337 A1* | 5/2011 | Grant | ..................... H04B 1/707 |
| | | | 370/335 |
| 2011/0141960 A1* | 6/2011 | Liu | ....................... H04L 1/0022 |
| | | | 370/311 |
| 2012/0218882 A1* | 8/2012 | Ko | ......................... H04L 1/1607 |
| | | | 370/216 |
| 2012/0230268 A1* | 9/2012 | Marinier | ............... H04L 5/0053 |
| | | | 370/329 |
| 2012/0275403 A1* | 11/2012 | Zhang | .................. H04B 7/0404 |
| | | | 370/329 |
| 2015/0029990 A1* | 1/2015 | Marinier | ............... H04L 5/0053 |
| | | | 370/329 |
| 2015/0195823 A1* | 7/2015 | Seo | ................... H04W 72/0406 |
| | | | 370/329 |
| 2015/0215087 A1* | 7/2015 | Park | ....................... H04B 7/024 |
| | | | 370/252 |
| 2015/0236825 A1* | 8/2015 | Park | ...................... H04L 5/0035 |
| | | | 370/329 |

FOREIGN PATENT DOCUMENTS

| | | |
|---|---|---|
| WO | WO2005/048563 | 5/2005 |
| WO | WO2005/101884 | 10/2005 |
| WO | WO2010/051514 | 5/2010 |
| WO | WO2010/107699 | 9/2010 |

OTHER PUBLICATIONS

Alcatel-Lucent, "S-DPCCH design for UL Transmit Diversity", $3^{rd}$ Generation Partnership Project (3GPP), R1-111425, May 5, 2011. See section 2.1 especially.

Qualcomm Europe, "Physical Channel Layout and Design for DC HSUPA", 3rd Generation Partnership Project (3GPP), R1-091726, Apr. 28, 2009. See section 3.4 especially.

European Search Report for EP 14 16 4673 dated Jun. 27, 2014.

* cited by examiner

| E-TFCI | TB Size (bits) | E-TFCI | TB Size (bits) | E-TFCI | TB Size (bits) |
|---|---|---|---|---|---|
| 0 | 18 | 43 | 2724 | 86 | 7252 |
| 1 | 186 | 44 | 2742 | 87 | 7288 |
| 2 | 204 | 45 | 3042 | 88 | 7428 |
| 3 | 354 | 46 | 3060 | 89 | 7464 |
| 4 | 372 | 47 | 3078 | 90 | 7764 |
| 5 | 522 | 48 | 3296 | 91 | 7800 |
| 6 | 540 | 49 | 3316 | 92 | 7908 |
| 7 | 674 | 50 | 3334 | 93 | 7944 |
| 8 | 690 | 51 | 3378 | 94 | 8100 |
| 9 | 708 | 52 | 3396 | 95 | 8136 |
| 10 | 726 | 53 | 3414 | 96 | 8436 |
| 11 | 858 | 54 | 3732 | 97 | 8472 |
| 12 | 876 | 55 | 3750 | 98 | 8554 |
| 13 | 1026 | 56 | 3972 | 99 | 8600 |
| 14 | 1044 | 57 | 3990 | 100 | 8772 |
| 15 | 1062 | 58 | 4068 | 101 | 8808 |
| 16 | 1194 | 59 | 4086 | 102 | 9108 |
| 17 | 1212 | 60 | 4404 | 103 | 9144 |
| 18 | 1330 | 61 | 4422 | 104 | 9220 |
| 19 | 1348 | 62 | 4528 | 105 | 9256 |
| 20 | 1362 | 63 | 4646 | 106 | 9444 |
| 21 | 1380 | 64 | 4740 | 107 | 9480 |
| 22 | 1398 | 65 | 4758 | 108 | 9780 |
| 23 | 1530 | 66 | 5076 | 109 | 9816 |
| 24 | 1548 | 67 | 5094 | 110 | 9876 |
| 25 | 1698 | 68 | 5284 | 111 | 9912 |
| 26 | 1716 | 69 | 5302 | 112 | 10116 |
| 27 | 1734 | 70 | 5412 | 113 | 10152 |
| 28 | 1866 | 71 | 5430 | 114 | 10452 |
| 29 | 1884 | 72 | 5748 | 115 | N/A |
| 30 | 1986 | 73 | 5766 | 116 | 10532 |
| 31 | 2004 | 74 | 5940 | 117 | 10568 |
| 32 | 2022 | 75 | 5958 | 118 | 10788 |
| 33 | 2034 | 76 | 5984 | 119 | 10824 |
| 34 | 2052 | 77 | 6102 | 120 | 11124 |
| 35 | 2070 | 78 | 6420 | 121 | 11178 |
| 36 | 2370 | 79 | 6438 | 122 | 11188 |
| 37 | 2388 | 80 | 6596 | 123 | 11242 |
| 38 | 2406 | 81 | 6614 | 124 | 11460 |
| 39 | 2542 | 82 | 6756 | 125 | 11478 |
| 40 | 2560 | 83 | 6774 | | |
| 41 | 2670 | 84 | 7092 | | |
| 42 | 2706 | 85 | 7110 | | |

FIG. 5

| E-TFCI | TB Size (bits) | E-TFCI | TB Size (bits) | E-TFCI | TB Size (bits) |
|---|---|---|---|---|---|
| 0 | 18 | 43 | 2724 | 86 | 7252 |
| 1 | 186 | 44 | 2742 | 87 | 7288 |
| 2 | 204 | 45 | 3042 | 88 | 7428 |
| 3 | 354 | 46 | 3060 | 89 | 7464 |
| 4 | 372 | 47 | 3078 | 90 | 7764 |
| 5 | 522 | 48 | 3298 | 91 | 7800 |
| 6 | 540 | 49 | 3316 | 92 | 7908 |
| 7 | 674 | 50 | 3334 | 93 | 7944 |
| 8 | 690 | 51 | 3378 | 94 | 8100 |
| 9 | 708 | 52 | 3396 | 95 | 8136 |
| 10 | 726 | 53 | 3414 | 96 | 8436 |
| 11 | 858 | 54 | 3732 | 97 | 8472 |
| 12 | 876 | 55 | 3750 | 98 | 8554 |
| 13 | 1026 | 56 | 3972 | 99 | 8600 |
| 14 | 1044 | 57 | 3990 | 100 | 8772 |
| 15 | 1062 | 58 | 4068 | 101 | 8808 |
| 16 | 1194 | 59 | 4086 | 102 | 9108 |
| 17 | 1212 | 60 | 4404 | 103 | 9144 |
| 18 | 1330 | 61 | 4422 | 104 | 9220 |
| 19 | 1348 | 62 | 4628 | 105 | 9256 |
| 20 | 1362 | 63 | 4646 | 106 | 9444 |
| 21 | 1380 | 64 | 4740 | 107 | 9480 |
| 22 | 1398 | 65 | 4758 | 108 | 9780 |
| 23 | 1530 | 66 | 5076 | 109 | 9816 |
| 24 | 1548 | 67 | 5094 | 110 | 9876 |
| 25 | 1698 | 68 | 5284 | 111 | 9912 |
| 26 | 1716 | 69 | 5302 | 112 | 10116 |
| 27 | 1734 | 70 | 5412 | 113 | 10152 |
| 28 | 1866 | 71 | 5430 | 114 | 10452 |
| 29 | 1884 | 72 | 5748 | 115 | N/A |
| 30 | 1986 | 73 | 5766 | 116 | 10532 |
| 31 | 2004 | 74 | 5940 | 117 | 10568 |
| 32 | 2022 | 75 | 5958 | 118 | 10788 |
| 33 | 2034 | 76 | 6084 | 119 | 10824 |
| 34 | 2052 | 77 | 6102 | 120 | 11124 |
| 35 | 2070 | 78 | 6420 | 121 | 11178 |
| 36 | 2370 | 79 | 6438 | 122 | 11188 |
| 37 | 2388 | 80 | 6596 | 123 | 11242 |
| 38 | 2406 | 81 | 6614 | 124 | 11460 |
| 39 | 2642 | 82 | 6756 | 125 | 11478 |
| 40 | 2660 | 83 | 6774 | | |
| 41 | 2678 | 84 | 7092 | | |
| 42 | 2706 | 85 | 7110 | | |

FIG. 6

HIGH SPEED UPLINK CONTROL CHANNELS

CROSS REFERENCE TO RELATED APPLICATIONS

This application claims priority to United Kingdom Application Number 1306830.9, filed on Apr. 15, 2013, the entirety of which is incorporated herein by reference.

TECHNICAL FIELD OF THE INVENTION

The invention concerns methods and network entities for communicating control signalling for an uplink high speed data service, a downlink high speed data service or both over a radio interface of a cellular network.

BACKGROUND TO THE INVENTION

Cellular radio systems, particularly those specified by the Third Generation Partnership Project (3GPP) have evolved to provide data services of increasingly higher speeds. Increased usage of high speed services (for example, due to the proliferation of smartphones) has increased the strain on various parts of the network. An example of such high speed services are the High Speed Packet Access (HSPA) functionalities provided for UMTS architectures (sometimes referred to as 3G) individually in both downlink and uplink. 3GPP Technical Specification (TS) 25.308 and TS 25.319 define the high-level design specifications for High Speed Downlink Packet Access (HSDPA) and High Speed Uplink Packet Access (HSUPA) respectively.

The uplink control channels are required to support these high speed services in both downlink and uplink. The signalling load on these channels is high and, particularly in high user load situations, this may lead to spectral inefficiency and an increased cost per bit of useful user-plane data. Conversely, reducing the uplink control channel overhead would increase the data capacity in each cell and make the spectrum and cell site use more efficient.

Referring to FIG. 1, there are shown a number of data frame structures for existing control channels in a UMTS cellular radio network. At the top of FIG. 1, there is shown the data frame structure for the Enhanced-Dedicated Physical Control Channel (E-DPCCH). This is used to send information to the Node B that aids it in decoding the corresponding uplink Enhanced-Dedicated Physical Data Channel (E-DPDCH). The information includes: the Retransmission Sequence Number (RSN); an Enhanced-Transport Format Combination Indicator (E-TFCI); and a happy bit. The RSN is used to identify data that is transmitted multiple times but encoded differently each time. The Node B uses the RSN to establish how to decode the data each time. The E-TFCI is the transport format of the data sent on the EDPDCH. The happy bit provides an indication of whether the mobile terminal has the possibility to send more data. In other words, it indicates whether there is more data in the mobile terminal's buffer and the power available to send it.

The Dedicated Physical Control Channel (DPCCH) includes: pilot bits; a Transport Format Combination Indicator (TFCI); a Feedback Indicator (FBI); and a Transmit Power Control (TPC) command. The pilot bits are used for channel estimation and the TPC commands are used to instruct the Node B whether the mobile terminal requires the corresponding DPCCH or Fractional Dedicated Physical Channel (F-DPCH) power in the downlink to be increased or decreased.

It may be seen that the E-DPCCH and DPCCH each comprise 10 information bits and are spread to 2560 chips. This defines one slot, three slots forming a sub-frame of 2 ms duration. Five sub-frames define a single 10 ms radio frame.

The High Speed Dedicated Physical Control Channel (HS-DPCCH) provides feedback information to allow the Node B to control the High Speed Downlink Physical Shared Channel (HS-DPSCH) that is transmitted in the downlink. This channel comprises: a Hybrid-Automatic Repeat Request (HARQ) Acknowledgment (ACK); and Channel Quality Information (CQI). The HARQ ACK information informs the Node B if the data sent on the HS-DSCH has been received, by sending ACK (acknowledged), NACK (not acknowledged) or DTX (no ACK or NACK sent). The CQI indicates the downlink channel conditions observed by the mobile terminal to the Node B. The HS-DPCCH is one sub-frame in duration, as indicated in FIG. 1. Further details regarding the channel formats may be found in 3GPP TS 25.211, TS 25.212, and TS 25.321.

All of the information data items in these uplink control channels are currently understood to be essential to the operation of services being provided, including the high speed data service on the uplink and/or downlink. Nevertheless, reduction in overheads can lead to an increase in capacity. An existing approach to reducing overheads is Continuous Packet Connectivity (CPC). This acts to reduce the periodicity of transmission for control channel information in the uplink, specifically for mobile terminals that are not receiving, not sending data or neither receiving nor sending data. This thereby reduces the level of control overheads over the radio interface.

Nevertheless, the data frame formats that are used remain the same. Moreover, and this solution is not applicable for those mobile terminals that are sending data, receiving data or both. Further reduction in these overheads, whilst still ensuring that the system can operate robustly, effectively and without requiring significant structural changes to the system design is a significant challenge in the improvement of the network.

SUMMARY OF THE INVENTION

Against this background and in a first aspect, the present invention provides a method of communicating control signalling for a high speed data service over a radio interface of a cellular network. The cellular network also supports a low speed service. The method comprises: communicating an uplink primary physical control channel between the network and a User Equipment (UE), the uplink primary physical control channel comprising only pilot bits.

In this first aspect, the uplink primary physical control channel (which may be used for providing control information relating to non-specific dedicated or shared data channels, such as a primary DPCCH) is used only for sending pilot bits. Pilot bits are the bits used for channel estimation, which may be a training sequence or a sequence of bits of the same value (such as all 1). The low speed service may be provided using a separate type of data channel from the high speed service.

Other uplink physical control channels may be provided by the UE, such as another physical control channel (separate from the uplink primary physical control channel on which this aspect is based) that may be used for control of the high speed data service channel, such as a HS-DPCCH, E-DPCCH or both. Additionally or alternatively, an uplink secondary physical control channel may be provided in addition to the uplink primary physical control channel. In this case, the uplink secondary physical control channel may be configured to comprise only pilot bits also. A primary control channel may be understood with reference to 3GPP specifications (although the DPCCH is not explicitly referred to as a primary DPCCH in the 3GPP specifications, a secondary DPCCH is defined for transmit diversity in uplink usage) or it may be considered as the uplink physical control channel associated with a dedicated traffic channel.

In the preferred embodiment, the uplink primary physical control channel does not comprise a Transport Format Combination Indicator (TFCI). Preferably, the uplink primary physical control channel does not comprise a feedback indication (FBI). Advantageously, the uplink primary physical control channel does not Transmit Power Control (TPC) commands. TPC bits may be used for indicating to the network the power control of the downlink channels. It has been found that the downlink power control is not critical for the provision of high speed services because Channel Quality Indicator (CQI) reporting from the mobile terminal can be used to control the downlink transmission resources, so their omission does not adversely affect the service quality.

Optionally, the pilot bits of the uplink primary physical control channel comprise a combination of a predetermined pilot sequence with additional data. This combination may be achieved by joint coding of the pilot sequence and the additional data. The additional data advantageously comprises Hybrid Automatic Repeat Request (HARQ) data. Beneficially, the H-ARQ data is for the channel or channels carrying the high speed data service. In the preferred embodiment, the combination of the predetermined pilot sequence with the H-ARQ data may be achieved by summing (exclusive OR). Optionally, the pilot sequence may be a series of bits of the same value, such as all one. The power allocated to the uplink primary physical control channel may be increased in comparison with uplink primary physical control channels in which the pilot bits carried by the channel only comprise a pilot sequence.

In the preferred embodiment, the high speed data service comprises a downlink high speed data service. The method may then further comprise: communicating a second uplink physical control channel for the downlink high speed data service, the second uplink physical control channel comprising a Channel Quality Indicator (CQI) only. Preferably, the second uplink physical control channel is a high speed-dedicated physical control channel (HS-DPCCH). This may be achieved by jointly coding the pilot sequence and H-ARQ data and transmitting the jointly coded information using the primary DPCCH.

In a variant of the first aspect, there is provided a method of communicating uplink control channel data between the network and a User Equipment (UE), comprising: jointly coding a pilot sequence and Hybrid Automatic Repeat Request (H-ARQ) data. The jointly coded data may then be transmitted over a single uplink physical control channel. In a further variant of the first aspect, there is provided a method of communicating control signalling for a data service over a radio interface of a cellular network. The method comprises: communicating an uplink physical control channel between the network and a User Equipment (UE), the uplink physical control channel comprising a Channel Quality Indicator (CQI) only. The data service may be a high speed data service, the cellular network also supporting a low speed service. Additionally or alternatively, the data service may be a downlink data service.

In a second aspect, there is provided a method of communicating control signalling for an uplink high speed data service using at least one physical data channel over a radio of a cellular network. The at least one physical data channel supports a set (a plurality) of transport formats. The set of transport formats contains a first number of transport formats (this being the total number of transport formats in the set). The method comprises: establishing a subset from the set of transport formats for use by a user equipment (UE), in transmitting to the network, based on at least one parameter of the UE, network or radio interface; and indicating to the network from the UE, the transport format used by the UE of the at least one physical data channel, the transport format to be used being selected from the established subset of transport formats. The subset contains a second number of transport formats, less than the first number of transport formats. In other words, the subset is smaller than the set.

By restricting the number of transport formats used by the UE in the uplink based on one or more parameters of the UE, network or radio interface, the amount of signalling needed for communicating the transport format used by the UE is reduced, because the number of bits needed to represent the transport format is determined by the number of possible transport formats that may be used. By reducing the set of transport formats that may be used, the number of bits needed to communicate the specific selected transport format is reduced.

Optionally, the cellular network also supports a low speed service. The low speed service may be provided using a separate type of data channel from the high speed service. In the preferred embodiment, the at least one physical data channel comprises a Enhanced Dedicated Physical Data Channel (E-DPDCH).

Optionally, the step of establishing a subset may comprise identifying a plurality of subsets from the set of transport formats for use by a user equipment (UE), in transmitting to the network, each subset being based on a condition of at least one parameter of the UE, network or radio interface. The method may then further comprise: establishing a subset from the plurality of subsets, the established subset being based by determining a current value for the respective parameter and comparing the determined parameter with the respective condition. Additionally or alternatively, the step of indicating to the network from the UE may be repeated dynamically.

Advantageously, the at least one parameter comprises one or more of: traffic loading on a cell of the network being used by the UE; radio channel quality between the UE and the network; UE location; UE device type or category; and a type of service or application being provided to the UE.

Preferably, the step of establishing is carried out by the network. Then, the method may further comprise: communicating an indication of the established subset of transport formats from the network to the UE. This may be provided by communicating one or more table identifiers that each indicate a table of transport formats to be used when one or more predetermined conditions in relation to the at least one parameter are met. The UE can then use the table identifier to determine the established subset.

The step of indicating optionally comprises communicating an indication of the selected transport format. The UE may thereby communicate the selected transport format to the network. The indication may comprise a variable number of bits, determined based on the size of the established subset of transport formats. For example, if there are normally 64 transport formats in total (so requiring 6 bits), but the established subset only comprises 4 transport formats, the number of bits required for communicating the indication of the selected transport format reduces to 2 bits. This results in an overhead reduction.

Alternatively, the step of indicating may comprise communicating the at least one physical data channel from the UE to the network using the selected transport format; and determining the selected transport format from the communicated at least one physical data channel at the network, based on knowledge of the established subset of transport formats. In view of the reduction in the number of transport formats to be determined by the network, blind detection of the transport format may now be possible. This may mean that the number of additional overhead bits required to indicate the selected transport format to the network from the UE is zero. Normally, blind detection is not seen as feasible in view of a large number of transport formats that may be used by the UE. Reducing the number of possible transport formats from which the UE may select (by establishing a subset accordingly) thereby permits blind detection in this way.

In the preferred embodiment, an uplink physical control channel for the uplink high speed data service is divided into transmission time slots, the data format of the uplink physical control channel being repeated in each transmission time slot. Then, the method may further comprise communicating the uplink physical control channel for the uplink high speed data service during only a fraction of the transmission time slot. In other words, the uplink physical control channel for the uplink high speed data service is formed partially by actual transmission bits and partially by non-transmission time. Another way to consider this is as a channel transmitted over a full transmission time slot, in which part of the channel transmission time slot contains transmission bits and another part of the channel transmission time slot contains no transmission bits (which might be considered as silence). Thus, data capacity is freed up in the transmission slot and this capacity can be used to allocate transmission power to another channel or to transmit other data in this channel. The uplink physical control channel may be an Enhanced Dedicated Physical Control Channel (E-DPCCH).

The method of the second aspect may be combined with the method of the first aspect (with or without any of the optional features described herein) to provide additional improvements, particularly increasing the level of overhead reduction on the DPCCH, E-DPCCH and HS-DPCCH.

In a third aspect, there is provided a method of communicating control signalling for first and second data services over a radio interface of a cellular network. The method comprises: generating first control signalling at a User Equipment (UE) in relation to the first data service; generating second control signalling at the UE in relation to the second data service; and communicating the first and second control signalling from the UE to the network over respective first and second time periods, wherein the first and second time periods do not overlap. The step of communicating the first and second control signalling may therefore be considered as achieved in a time-aligned way, so as to avoid simultaneous transmission of the first and second control signalling.

In this way, the control signalling for the first data service and second data service can be transmitted in a more power-efficient way. Simultaneously transmitting the control signalling for the two data channels reduces the transmission power than can be used for each control channel. By combining the signalling in this way, more capacity can be used for other channels, in particular, the data channel for user plane traffic.

Advantageously, the first and second data services are high speed data services. Optionally, the cellular network also supports a low speed service. The low speed service may be provided using a separate type of data channel from the high speed service. Preferably, the first data service is a downlink data service. Additionally or alternatively, the second data service may be an uplink data service.

Preferably, the first and second control signalling are transmitted using respective, separate physical channels. For example, the first control signalling may be transmitted using a HS-DPCCH and the second control signalling may be transmitted using a E-DPCCH. Alternatively, the first and second control signals can be combined and transmitted using the same physical channel.

Advantageously, the method according to the third aspect may be combined with the method according to the first aspect (or according to a variant of this aspect). In one sense, as well as transmitting the control channels for the uplink and downlink high speed data services in a combined, power-efficient way, the improved uplink primary physical control channel may also be provided. In a particular embodiment, further benefits may be obtained by communicating the uplink physical control channel for the downlink high speed data service which comprises a CQI only (which may be a HS-DPCCH). Then, the improved uplink physical control channel for the downlink high speed data service may be the first control signalling. For example, the step of generating first control signalling may comprise generating a Channel Quality Indicator, CQI, in respect of the first data service. This reduces the quantity of data to be transmitted using the uplink physical control channel for the downlink high speed data service and helps to allow the combination of the uplink physical control channels for both the uplink high speed data service and downlink high speed data service.

Additionally or alternatively, the method according to the third aspect can be combined with the method according to the second aspect. In other words, the control signalling for the uplink high speed data service can be provided with an improved Transport Format Indicator or no Transport Format Indicator. Then, the improved uplink physical control channel for the uplink high speed data service may be the second control signalling. This frees up capacity on the uplink physical control channel for the uplink high speed data service, thereby helping to make the combination of the uplink control channels for the uplink high speed data service and downlink high speed data service.

In another sense, the step of generating second control signalling may comprise generating signalling for an uplink high speed data service, the cellular network also supporting a low speed service. The signalling for an uplink high speed data service may comprise some or all of the data normally transmitted over an E-DPCCH. For example, this may comprise one or more: a Retransmission Sequence Number (RSN); an Enhanced-Transport Format Combination Indicator (E-TFCI); and a happy bit. In some embodiments, the E-TFCI may not be needed. Optionally, the method may further comprise: generating third control signalling at the UE in relation to a third data service. The step of communicating may then comprise communicating the first, second and third control signalling from the UE to the network over respective first, second and third time periods, wherein none of the first, second and third time periods overlap with one another. Beneficially, the improved DPCCH comprising jointly coded pilot bits and H-ARQ data may form the third control signalling.

The methods according to all of the aspects defined herein are preferably intended for UMTS cellular networks. Then, a physical channel may be defined according to the allocation of a specific spreading code. In particular, the cellular network they provide for high speed data service or high speed data services using high speed packet access (HSPA) functionality. In other words, the downlink high speed data service may be High Speed Downlink Packet Access (HSDPA) and the uplink high speed data service may be High Speed Uplink Packet Access (HSUPA).

In another aspect, there may be provided a network entity of a cellular network, comprising control logic configured to operate in accordance with the method according to any aspect described herein. Additionally or alternatively, there may be provided a User Equipment (UE) for a cellular network, comprising control logic configured to operate in accordance with the method according to any aspect described herein. The network entity or UE may comprise a transmitter, receiver or both. Additionally or alternatively, they may comprise a controller for a transmitter, receiver or both. Moreover, they may comprise a processor.

In a yet further aspect, there may be provided a transmission signal configured to carry transmission data in accordance with the method of any aspect described herein. This signal may form part of a larger signal, in that it may define one channel within a multi-channel signal.

A computer program, configured when operated by a processor to carry out the method according to any aspect described herein, may also be provided. Programmable logic or other kinds of control logic configured to operate in accordance with any of the methods described herein may also be provided.

A combination of any features from within one aspect or between aspects is also provided, even if not explicitly disclosed.

BRIEF DESCRIPTION OF THE DRAWINGS

The invention may be put into practice in various ways, one of which will now be described by way of example only and with reference to the accompanying drawings in which:

FIG. 5 shows an exemplary first table of transport formats in accordance with the implementation of FIG. 4;

FIG. 6 shows an exemplary second table of transport formats in accordance with the implementation of FIG. 4;

FIG. 7 shows a data frame structure for an uplink physical control channel for an uplink high speed data service resulting from the method shown in FIG. 4;

DETAILED DESCRIPTION OF A PREFERRED EMBODIMENT

Figure 1:
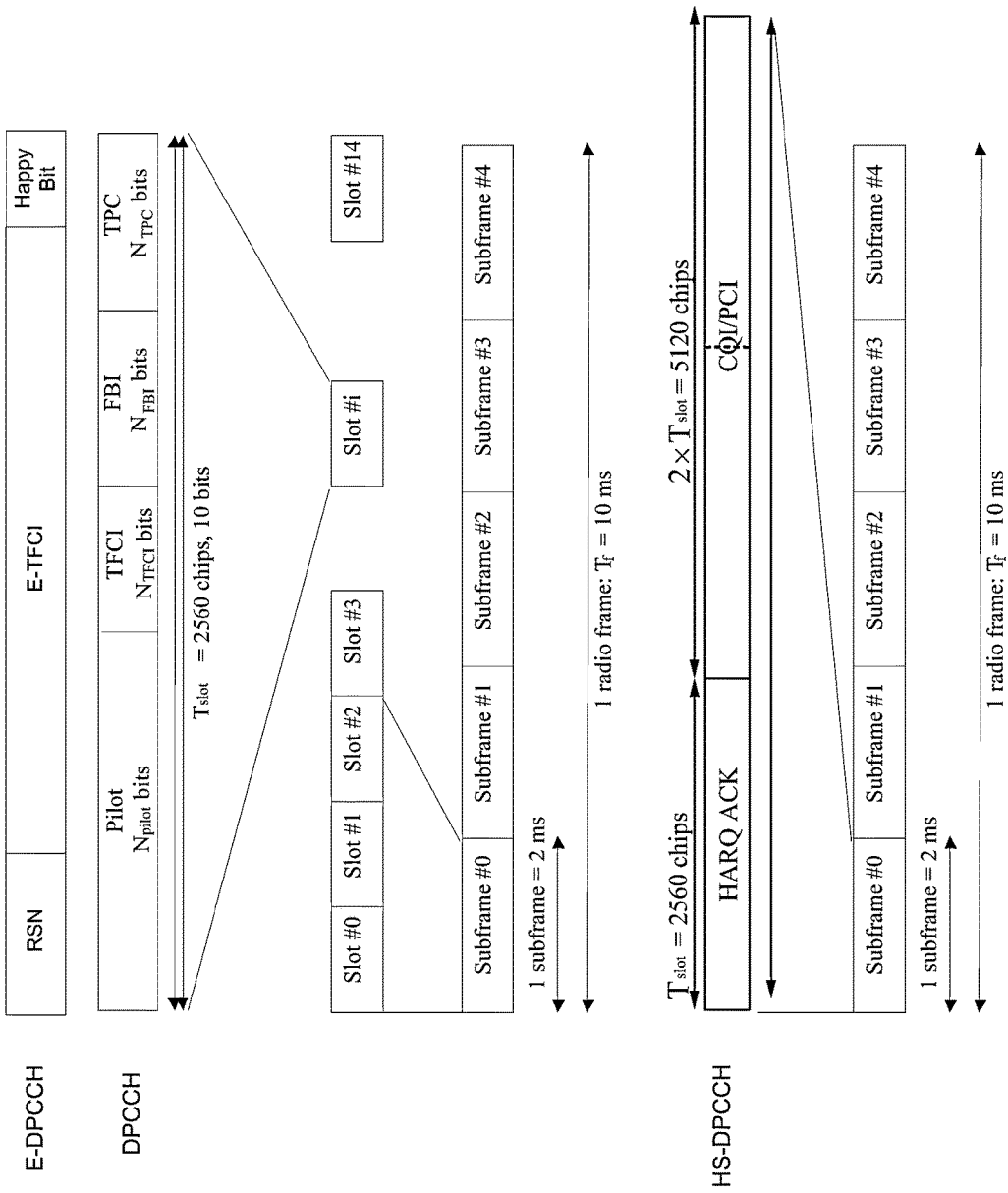
FIG. 1 shows a number of data frame structures for existing control channels in a UMTS cellular radio network.

Improving the performance of the uplink control channels can be achieved by reducing the number of control information bits that are sent on the radio interface uplink in order to allow high speed data services, such as High Speed Packet Access (HSPA) to be operated by the UE. The details below relate to UMTS-based architectures, in particular those using HSPA. Nevertheless, it will be understood that the invention may be applied to similar architectures in which the cellular network provides a first, low-speed data service using one or more low speed channels and a second, high-speed data service using one or more separate channels. A specific embodiment invention is now described by considering various aspects of the system.

Simplified Uplink Primary Control Channel

This approach can be implemented on the Primary Dedicated Physical Control Channel (DPCCH) in the uplink. In order to reduce the overhead of the primary DPCCH, a simple slot format made only of pilot bits can be used. Such a slot format is already available in the 3GPP specifications, but it is only allowed to be used on a secondary DPCCH when uplink closed loop transmit diversity is used. However, the same channel structure can advantageously be used on the primary DPCCH. 3GPP specifications do not currently allows this for a number of reasons.

In particular, it is understood that TPC bits must be transmitted on the primary DPCCH. These are used for indicating to the network the power control of the downlink DPCCH channel. However, these are not very useful when a Fractional Dedicated Physical Channel (F-DPCH) is used on the downlink. This is likely when the Signalling Radio Bearer (SRB) in the uplink is mapped onto the uplink data channel. Downlink power control is not critical for HSDPA users, in fact, so such TCP bits could be used for voice users using the DPCCH, for example, but removed for HSUPA calls.

No data is sent on the Dedicated Physical Data Channel (DPDCH) when HSPA is operative, such that the TFCI bits normally transmitted on the DPCCH are redundant. The signalling radio bearer is mapped onto the Enhanced Dedicated Physical Data Channel (E-DPDCH), such that the ETFCI bits are provided using the E-DPCCH. Thus, the TFCI bits can be removed from the DPCCH without problem.

In general, closed loop transmit diversity defined in 3GPP Release 99 is not used, due to poor performance and interworking. Thus, the FBI bits on the DPCCH are redundant. These can also be removed without consequence.

Only using pilot bits for the DPCCH transmission for HSUPA calls means that the overhead of the channel is substantially reduced.

Nevertheless, further improvements can be made. In particular, data bits that are sent on another uplink control channel can be transferred to the DPCCH. The pilot sequence can be jointly coded with further bits, especially from another uplink control channel, to create a combined set of bits and these may be transmitted over one new common channel. This may be achieved by combining the pilot sequence transmitted on the DPCCH with the H-ARQ ACK bits, currently transmitted on the HS-DPCCH. The H-ARQ ACK field conveys information to indicate whether the downlink data channel was successfully received (ACK) or not (NACK). The DPCCH pilot field conveys a known bit stream to allow the network to correctly estimate the phase and magnitude of the signal that were received from other channels.

Jointly coding the H-ARQ ACK bits with the pilot bits on the same physical channel allows for an overall reduction in the amount of power to be sent to convey the two sets of information. This can be achieved by summing the pilot bits (which conventionally all have the value 1 although other predetermined sequences known to both network and UE may be used) with the value of each H-ARQ ACK bits to get a resulting value.

Figure 2:
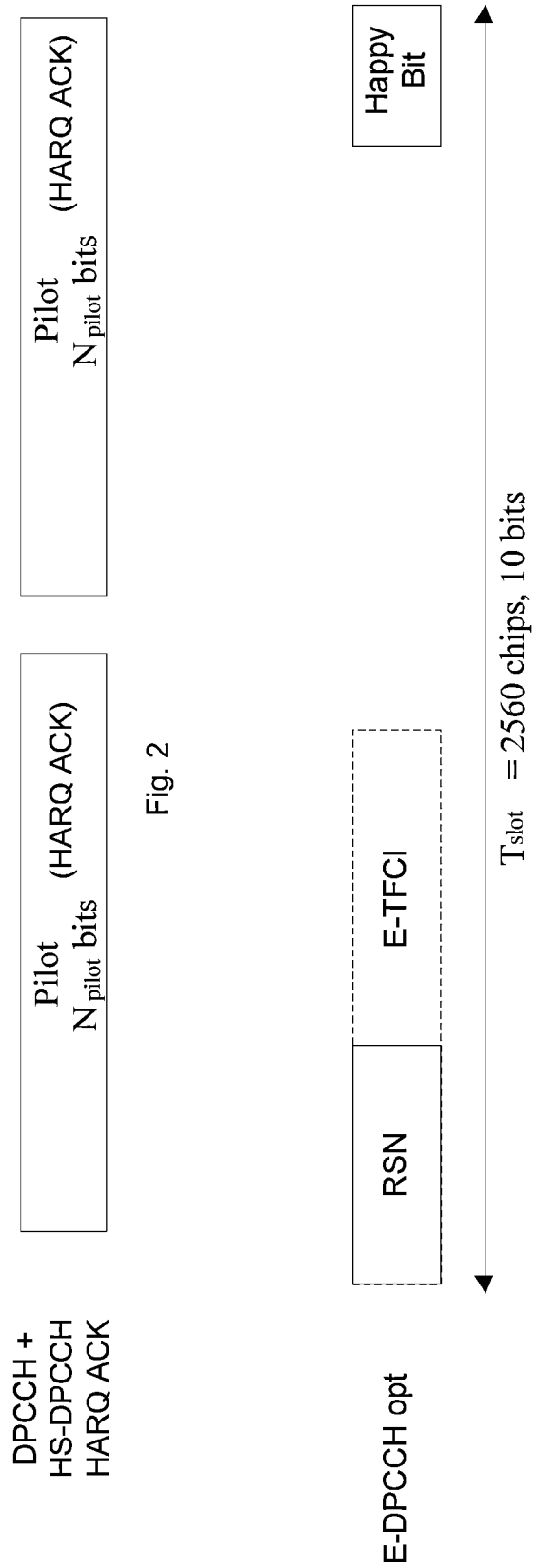
FIG. 2 illustrates a data frame structure for an improved uplink primary physical control channel.

Referring now to FIG. 2, there is illustrated a data frame structure for an improved uplink primary physical control channel, specifically the primary DPCCH. This shows the jointly coded pilot sequence and HARQ ACK data. The resulting bits are transmitted with a slightly higher power than that used to transmit the original H-ARQ part of the HS-DPCCH and the DPCCH channels consumed. This higher power may allow the Node B receiver to use the jointly coded signal for channel estimation. The start and end timing of the H-ARQ ACK field is not required to be time-aligned with the DPCCH slot start or end time. By doing this, only the CQI field would need to be transmitted on the HS-DPCCH channel.

The transmission power used for communicating the jointly coded pilot bits and H-ARQ ACK may be determined as follows. The fixed Signal-to-Noise Ratio (SNR) needed is determined by the network, based on what it needs to decode the pilot bits and HARQ information. The absolute power then transmitted by the UE will then vary depending on where it is in the cell, and the amount of noise, based on the network providing power control information on the downlink (using the F-DPCH), telling the UE to increase or decrease transmission power.

Compressed Transport Formant Combination Indicator

Another way to improve the efficiency of the uplink control channels is to reduce the number of bits required for some information fields or indeed, remove the field altogether. In particular, this can be applied to the Enhanced Transport Format Combination Indicator (E-TFCI) field used in the E-DPCCH. The E-TFCI field that is sent on the E-DPCCH indicates the size of data that is sent over the corresponding uplink data channel (E-DPDCH). The E-DPCCH and E-DPDCH channels are sent in parallel. The E-TFCI field is, according to the existing standards, coded with 7 bits from the 10 bits transmitted during one slot of the E-DPCCH.

However, situations can arise in which the number of enhanced transport format combinations that would be applicable for the UE to use may be limited. For example, these situations might include: where the UE is near the cell edge, far from the Node B; when the cell is highly loaded; when the UE uses a fixed data rate or low data rate application (for example, a machine to machine device); and a UE device type or category (for example 2798 bits for category 2, 2 ms TTI). Different UE categories have maximum peak rates (due to UE processing limits), so as the number of E-TFCs may be limited by the peak rate that the UE can support. This may provide one subset of e-TFCs. As the radio conditions and load vary, the use of a particular "ETFC subset table" may be a dynamic decision, such that the different conditions may be met during the same call. This allows opportunities to recode the E-TFCI in such situations to use a set of E-TFCIs that are coded with a lower number of bits.

Figure 3:
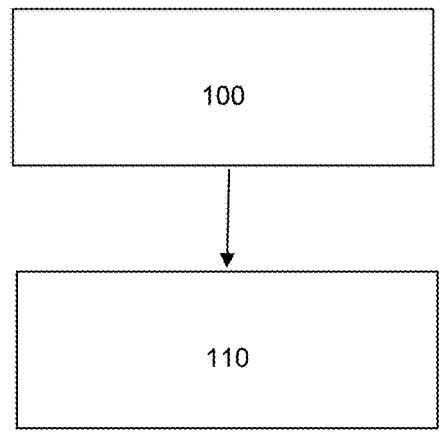
FIG. 3 depicts a flowchart for an improved way of communicating control signalling for an uplink high speed data service.

Referring next to FIG. 3, there is depicted a flowchart for an improved way of communicating a control signal for an uplink high speed data service, particularly on the E-DPCCH. In step 100, a subset of the plurality of TFCIs for use by the UE is established. This subset is based on at least one parameter of the UE, network or radio interface, for example as discussed above for the cases where the range of E-TFCIs may be reduced. Then, in step 110, the UE indicates to the network a transport format to be used by the UE on the physical data channel, particularly the E-DPDCH. The transport format to be used is selected from the established subset of transport formats.

Practically, this process can be achieved as follows. The reduced and recoded E-TFCI bits are configured by the network at the start of the call. At the start of the call, the network signals to a mobile terminal the applicable E-TFCI tables to be used during the call. The signal tables will be stored by the mobile terminal for usage during the call and will depend on one of the example conditions being met either at the start of the call or potentially during the call. If more than one table may be used during the call (for example due to channel conditions) the table used may change. Then, the network may dynamically signal to the mobile terminal to use one of the other tables within the set of tables originally signalled.

Figure 4:
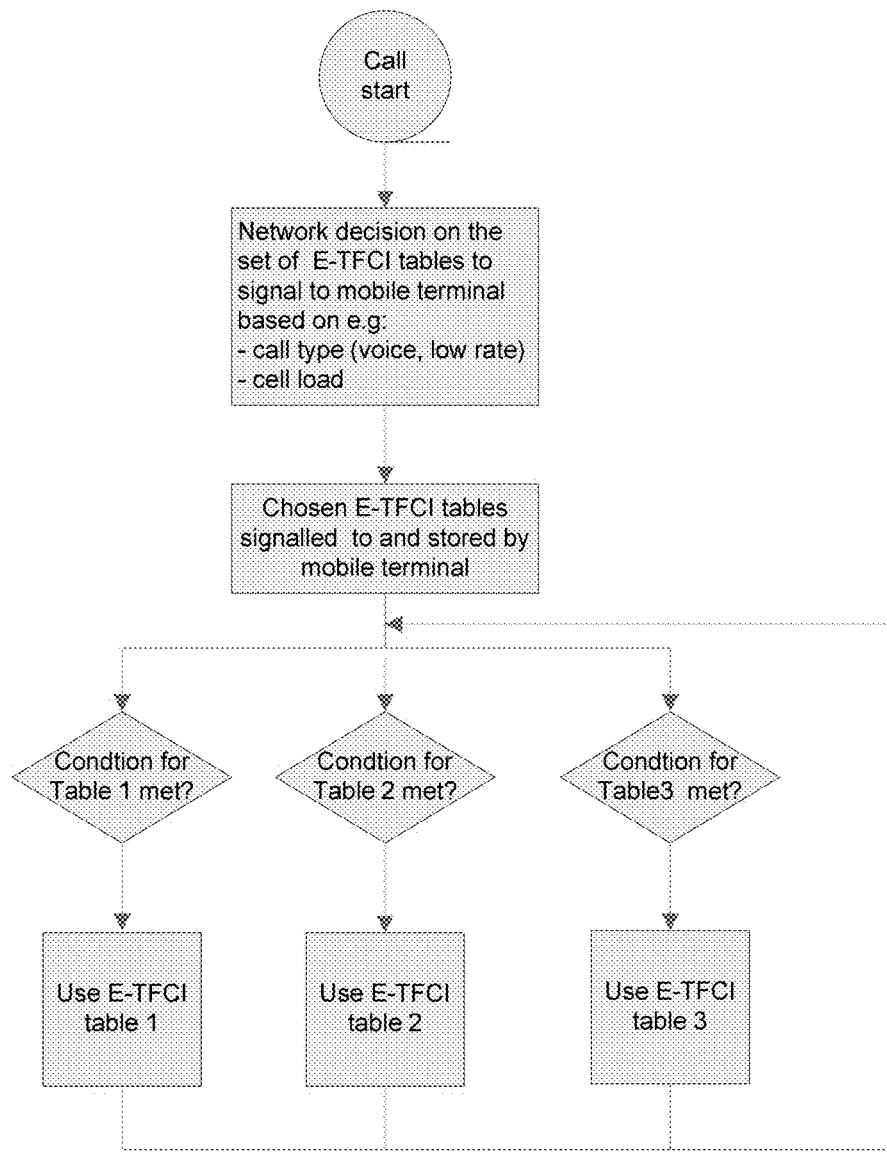
FIG. 4 depicts a flowchart for a more specific, detailed implementation in accordance with FIG. 3.

Referring next to FIG. 4, there is depicted a flowchart for a more specific, detailed implementation in accordance with FIG. 3, illustrating the approach described above. The network makes a decision on the set of E-TFCI tables to signal to the mobile terminal at the start of the call (this may be a default condition). Then the chosen E-TFCI tables are signalled to the UE and the UE stores them. When the condition for a specific table is met, that table is used and a reduced E-TFCI is transmitted.

Examples of the tables and their respective conditions for usage are now discussed. Referring to FIG. 5 there is shown an exemplary first table of transport format in accordance with the implementation of FIG. 4. This example table (Example 1) is for a UE near a cell edge or high loaded cell (not applicable E-TFCs in grey).

Referring next to FIG. 6, there is shown an exemplary second table of transport formats in accordance with the implementation of FIG. 4. This table (Example 2) shows E-TFCs limited by the service/application type (not applicable E-TFCs in grey). Example 1 shows where the E-TFCI could be reduced to 4 bits. Example 2 shows where the E-TFCI could be reduced to 2 bits. In order for this to work, the network desirably configures the UE (via signalling) with the subset of E-TFCs that it is allowed to use to transmit uplink data.

A further optimisation (due to the reduced set of ETFCs) would be for the network to blindly detect the E-TFC that is used by the UE to transmit data. Blind detection of transport formats is a function that is already performed by the Node B for certain types of existing Release 99 channels in UMTS, but is not used for HSUPA operation. This is because the number of transport format combinations are too high and would result in detection errors. Using blind transport format detection would allow for the removal of all E-TFCI bits in the scenarios where applied.

Referring to FIG. 7, there is shown a data frame structure for an uplink physical control channel for an uplink high speed data service resulting from the method shown in FIG. 4. Effectively, a new E-DPCCH frame structure results, with a smaller, variable number of E-TFCI bits. However, the E-TFCI may also be removed completely with the further optimisation described above, using blind detection. For the remaining bits, the UE would be able to not transmit on this channel, meaning that transmitted power is reduced, allowing an increase in uplink cell resources for user data.

Combining Uplink Physical Control Channels

Figure 8:
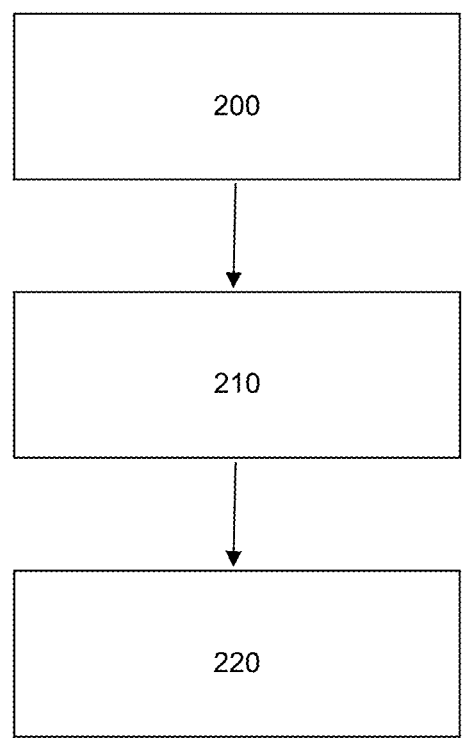
FIG. 8 shows a flowchart for an improved way of communicating control signalling for uplink and downlink high speed data services.

Improvement in the uplink control overheads may also be possible by combining uplink physical control channels. Referring now to FIG. 8, there is shown a flowchart for an improved way of communicating control signalling for uplink and downlink high speed data services. In step 200, first control signalling is generated at the UE. This first control signalling is in relation to the downlink high speed data service. In step 210, second control signalling is generated at the UE, in relation to the uplink high speed data service. Finally in step 220, the first and second control signalling is communicated from the UE to the network in a time-aligned way, so as to avoid simultaneous transmission of the first and second control signalling. Step 210 may be achieved by use of the improved HS-DPCCH described above. Similarly, step 220 may be implemented by use of the improved E-DPCCH described above, in particular as shown in FIG. 7 for example.

Thus, after removing the HARQ ACK field from the HSDPCCH channel (modifying the channel structure design such that it can be combined with pilot bits on the DPCCH channel) and reducing the size of the E-TFCI field, a further optimisation is possible. This may reduce peak power transmitted by the UE in uplink by modifying the channel structure design. This may be achieved by configuring the timing of the transmission of the CQI field from the mobile terminal (in the HS-DPCCH) to be aligned with the timing of the E-DPCCH data, such that it maps to the time period over which the resulting E-DPCCH field is not being transmitted.

Figure 9:
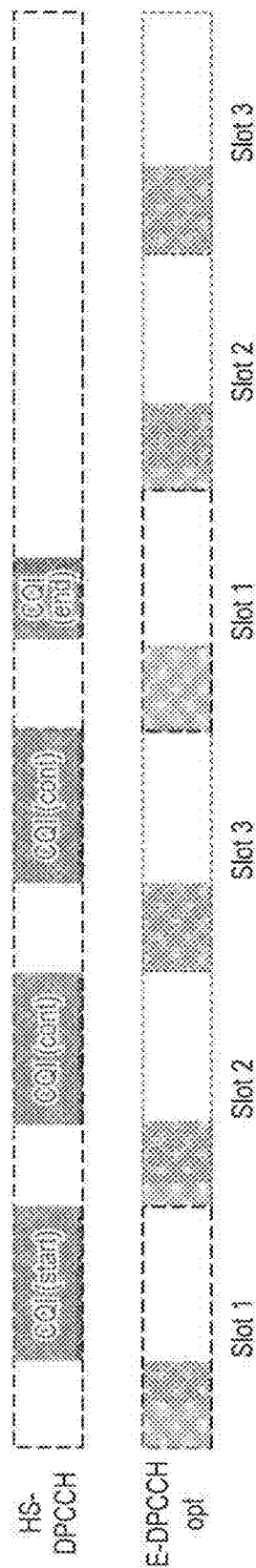
FIG. 9 shows data frame structures for the uplink physical control channels for the uplink and downlink high speed data services resulting from the method in accordance with FIG. 8.

Referring now to FIG. 9, there are shown data frame structures for the uplink physical control channels for the uplink and downlink high speed data services resulting from the method in accordance with FIG. 8. As can be seen, the HS-DPCCH channel and the E-DPCCH channel are configured so as to avoid simultaneous transmission of data. Also, the existing CQI field is signalled using 20 bits, but the frequency of reporting can be reduced significantly. Therefore with a reporting frequency of 8 ms, this would require 5 bits to be sent over 3 slots on average.

Therefore, the CQI field would be able to be transmitted entirely while the E-DPCCH is not being transmitted, as shown in FIG. 9. The CQI reporting is interleaved with the other data, which may effectively cause a slight reduction in CQI reporting frequency, a slight delay in reporting of CQI data or both. The usage of this optimised channel structure could be signalled by the network and be an additional configuration option to be applied by the mobile terminal when indicated.

Figure 10:
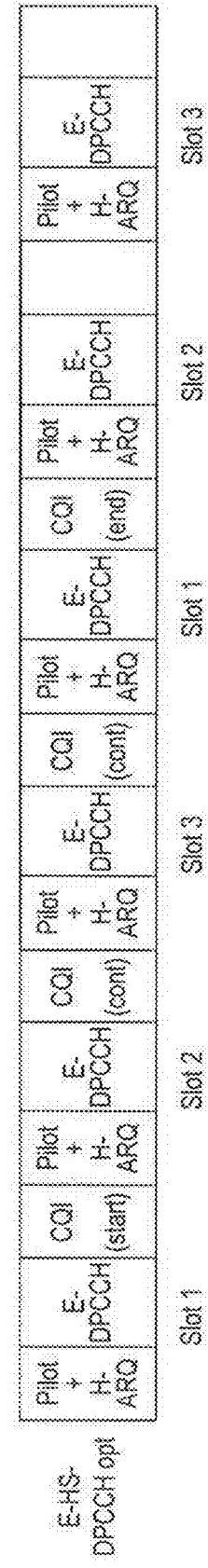
FIG. 10 shows a combined data frame structure for a single uplink physical control channel according to a further development of the data frame structures shown in FIG. 9.

A further optimisation could be to transmit the CQI on the optimised E-DPCCH channel. This would be a further combined channel with E-DPCCH containing the CQI field. The HS-DPCCH channel may not then need to be transmitted at all. This may be developed even further. Referring to FIG. 10, there is shown a combined data frame structure for a single uplink physical control channel according to a further development of the data frame structures shown in FIG. 9. Thus, the jointly coded pilot sequence and H-ARQ ACK data can be transmitted on the same channel as the optimised EDPCCH channel and the optimised HS-DPCCH channel (comprising the CQI reporting information only). This may be achieved by transmitting only a portion of the jointly coded pilot sequence and H-ARQ ACK data and a portion of the CQI data in each transmission time slot (such that these data are transmitted using fewer bits per slot). This is illustrated in FIG. 10, where it can be seen the CQI data is transmitted over 4 transmission time slots out of every six (that is over two subframes). The last two transmission time slots do not include any CQI data for example. Additionally or alternatively, the combined physical uplink control channel may use a higher spreading code than the existing DPCCH in order to create more than 10 data bits per slot. The order of the data transmitted in each slot may be varied, but pilot bits are typically transmitted first in each slot as shown.

A number of techniques for improving the communication of uplink signalling information in cellular radio networks have therefore been described. The benefits of each of these techniques is that they allow the peak transmission power to be reduced, by reducing bits, combining channels, and aligning transmission of different channels. All of these allow the reduction of uplink overhead, whilst simplifying the network receiver and optimising battery consumption at the UE.

In summary, three key approaches are used to reduce the amount of control information or resource required on the uplink. Firstly, information bits that are sent on one channel in existing approaches and combined with the pilot bits sent on another channel. These are jointly coded, such a combined set of bits can be sent over one new common channel. Secondly, the number of bits required in some information fields of a channel may be reduced, or the field may be removed altogether. Thirdly, multiple uplink physical control channels may be time-aligned to avoid simultaneous transmission or combined. There is significant overlap between these approaches and synergies may result from combinations including them.

Thus, a specific embodiment of the invention has been described above. Nevertheless, the skilled person will contemplate various modifications and substitutions. In particular, the specific channel identifiers are not always significant and channels with different names, but having the same effect may be alternatively used. Similarly, the application of the present invention is primarily designed for UMTS using CDMA (spread-spectrum) transmission, but the skilled person will appreciate that other architectures using different multiple access and channel definition technology are also possible.

The invention claimed is:

1. A method of communicating control signalling for an uplink high speed data service using at least one physical data channel over a radio interface of a cellular network, the at least one physical data channel supporting a set of transport formats containing a first number of transport formats represented by a specified number of signalling bits, the method comprising:

establishing a subset from the set of transport formats for use by a User Equipment (UE) in transmitting to the network, based on at least one parameter of the UE, network or radio interface, the subset containing a second number of transport formats less than the first number of transport formats, wherein establishing the subset of transport formats includes reducing the number of bits used to represent the subset of transport formats; and indicating to the network from the UE using the reduced number of bits, a transport format used by the UE on the at least one physical data channel, the transport format to be used being selected from the established subset of transport formats, wherein the uplink high speed data service is controlled using pilot bits and data of an uplink physical control channel, the pilot bits comprising a predetermined pilot sequence sent in addition to the data.

2. The method of claim 1, wherein the at least one parameter comprises one or more of:
traffic loading on a cell of the network being used by the UE;
radio channel quality between the UE and the network;
UE location;
UE device type;
UE category; and
a type of service or application being provided to the UE.

3. The method of claim 1, wherein the step of establishing is carried out by the network, the method further comprising:
communicating an indication of the established subset of transport formats from the network to the UE.

4. The method of claim 1, wherein the step of indicating comprises:
communicating an indication of the selected transport format, the indication comprising a variable number of bits, the variable number of bits being determined based on the size of the established subset of transport formats.

5. The method of claim 1, wherein the step of indicating comprises:
communicating the at least one physical data channel from the UE to the network using the selected transport format; and
determining the selected transport format from the communicated at least one physical data channel at the network, based on knowledge of the established subset of transport formats.

6. The method of claim 1, wherein an uplink physical control channel for the uplink high speed data service is divided into transmission time slots, the data format of the uplink physical control channel being repeated in each transmission time slot, the method further comprising:
communicating the uplink physical control channel for the uplink high speed data service during only a fraction of the transmission time slot.

7. A network entity of a cellular network, comprising non-transitory computer readable medium having stored thereon executable instructions that when executed by a processor, cause the network entity to perform the method of claim 1.

8. A method of communicating control signalling for a high speed data service using at least one physical data channel over a radio interface of a cellular network, the at least one physical data channel supporting a set of transport formats containing a first number of transport formats represented by a specified number of signalling bits, the cellular network also supporting a low speed service, the method comprising:
communicating an uplink primary physical control channel between the network and a User Equipment (UE) using an established subset of transport formats, the established subset of transport formats including a reduced number of bits used to represent the subset of transport formats, the uplink primary physical control channel comprising pilot bits comprising data used to control the high speed data service, wherein the pilot bits further comprise a predetermined pilot sequence to go along with the data.

9. The method of claim 8, wherein the high speed data service comprises a downlink high speed data service and wherein the pilot bits of the uplink primary physical control channel comprise a combination of a predetermined pilot sequence with Hybrid Automatic Repeat Request (H-ARQ) data.

10. The method of claim 9, further comprising:
communicating a second uplink physical control channel for the downlink high speed data service, the second uplink physical control channel comprising a Channel Quality Indicator.

11. A method of a communicating control signalling for first and second data services using at least one physical data channel over a radio interface of a cellular network, the at least one physical data channel supporting a set of transport formats containing a first number of transport formats represented by a specified number of signalling bits, the method comprising:
generating first control signalling at a User Equipment (UE) in relation to the first data service;
generating second control signalling at the UE in relation to the second data service; and
communicating the first and second control signalling from the UE to the network over respective first and second time periods using an established subset of transport formats, the established subset of transport formats including a reduced number of bits used to represent the subset of transport formats, wherein the first and second time periods are within the same time slot but do not overlap, wherein the first and second control signaling is controlled using pilot bits and data of the physical data channel, the pilot bits comprising a predetermined pilot sequence sent in addition to the data.

12. The method of claim 11, wherein the step of generating first control signalling comprises generating a Channel Quality Indicator, CQI, in respect of the first data service.

13. The method of claim 11, wherein the steps of generating second control signalling at the UE and communicating the second control signalling from the UE to the network comprise:
establishing a subset from a set of transport formats for use by the UE in transmitting to a network, based on at least one parameter of the UE, network or a radio interface, the subset containing a second number of transport formats less than a first number of transport formats; and
indicating to the network from the UE, a transport format used by the UE on at least one physical data channel, the transport format to be used being selected from the established subset of transport formats.

* * * * *